(12) United States Patent
Takahashi et al.

(10) Patent No.: US 6,661,487 B2
(45) Date of Patent: Dec. 9, 2003

(54) LAMINATED OPTICAL FILM, METHOD FOR PRODUCING THE SAME FILM AND LIQUID-CRYSTAL DISPLAY DEVICE USING THE SAME FILM

(75) Inventors: Naoki Takahashi, Ibaraki (JP); Satoru Kawahara, Ibaraki (JP); Shoji Sugiura, Ibaraki (JP); Takeyuki Ashida, Nara (JP); Takio Imai, Nara (JP)

(73) Assignees: Nitto Denko Corporation, Osaka (JP); Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 10/161,630

(22) Filed: Jun. 5, 2002

(65) Prior Publication Data

US 2002/0196397 A1 Dec. 26, 2002

(30) Foreign Application Priority Data

Jun. 7, 2001 (JP) .................................... P2001-171964

(51) Int. Cl.$^7$ ............................................. G02F 1/1335
(52) U.S. Cl. ........................ 349/115; 349/112; 349/96; 359/500
(58) Field of Search ................................. 349/112, 115, 349/96, 64, 197, 117, 119; 359/485, 487, 494, 497, 500

(56) References Cited

U.S. PATENT DOCUMENTS

| | | | | |
|---|---|---|---|---|
| 4,511,618 A | * | 4/1985 | Duchene et al. | 428/215 |
| 5,241,417 A | * | 8/1993 | Sekiguchi | 359/586 |
| 5,724,187 A | * | 3/1998 | Varaprasad et al. | 359/608 |
| 6,104,530 A | * | 8/2000 | Okamura et al. | 359/359 |
| 6,419,800 B2 | * | 7/2002 | Anzaki et al. | 204/192.12 |
| 6,542,298 B1 | * | 4/2003 | Aoki | 359/483 |

\* cited by examiner

*Primary Examiner*—Robert H. Kim
*Assistant Examiner*—David Chung
(74) *Attorney, Agent, or Firm*—Sughrue Mion, PLLC

(57) ABSTRACT

A method of producing a laminated optical film constituted by a laminate of a plurality of optical films different in area, the method including the steps of: laminating an optical film (B) having a plurality of rectangular holes parallel to one another, on at least one surface of an optical film (A) to thereby form a laminate; and cutting the laminate into a plurality of chips to thereby obtain laminated optical films.

8 Claims, 5 Drawing Sheets

LAMINATED OPTICAL FILM, METHOD FOR PRODUCING THE SAME FILM AND LIQUID-CRYSTAL DISPLAY DEVICE USING THE SAME FILM

The present application is based on Japanese Patent Application No. 2001-171964, which is incorporated herein by reference.

BACKGROUND OF THE INVENTION

1. Field of the Invention

The present invention relates a laminated optical film which is used for a liquid-crystal display device and which has excellent reworkability after sticking of the laminated optical film onto a liquid-crystal cell, as well as excellent machining characteristic and excellent dimensional accuracy, and to provide a method for producing the laminated optical film and a liquid-crystal display device using the laminated optical film.

2. Description of the Related Art

Shock resistance of a liquid-crystal display element and space saving of a liquid-crystal display device have been requested with the advance of spread of cellular phones in recent years. To satisfy the two requests, it is necessary to connect a backlight unit to a liquid-crystal cell constituting a liquid-crystal display device. In order to achieve the space saving, not a mechanically connecting method but a fixing method using a double-sided adhesive tape or the like is used. The double-sided adhesive tape is stuck onto an optical film stuck onto the liquid-crystal cell because there is no place where the double-sided adhesive tape is stuck onto a liquid-crystal cell substrate in order to save the space.

FIG. 8 is a sectional view showing the configuration of a related-art liquid-crystal display device. Phase retarders 22 and 22' and polarizers 21 and 21' are laminated successively on opposite surfaces of glass substrates 23 and 23' respectively. A luminance-enhancement film 26 is further laminated on the backlight-side polarizer 21. The luminance-enhancement film 26 is bonded to a backlight unit 34 through a double-sided adhesive tape 29. In the liquid-crystal display device provided with such a backlight, the luminance-enhancement film is used for enhancing luminance. A light polarizer-integrating type luminance-enhancement film constituted by a combination of a polarizer and a luminance-enhancement film stuck onto the polarizer is often used. A laminated optical film prepared by sticking a polarizer and a luminance-enhancement film of the same size to each other is generally used as the light polarizer-integrating type luminance-enhancement film.

The laminated optical film is processed into a size larger than the size of a display screen of the liquid-crystal display device. The optical film is stuck onto a liquid-crystal cell so that the displayable range of the liquid-crystal cell is covered with the optical film to prevent a phenomenon that a part of light entering the optical film from the backlight is missing in end portions of the film.

A problem, however, arises in a module reworking step if there is an adhesive layer weak in adhesive strength for sticking respective films or another layer weak in adhesive strength in the case where a double-sided adhesive tape is directly stuck onto a backlight-side optical film portion because a backlight unit is bonded to a liquid-crystal cell onto which an optical film is stuck as described above. That is, when a reworking operation is carried out to detach the backlight because a failure is found in the backlight after the backlight unit is bonded to the liquid-crystal cell, there is the possibility that the optical film may be broken. Also when intensive shock such as falling impact is given, the problem upon breaking of the optical film arises because force is concentrated into the laminated optical film which is a joint portion between the liquid-crystal cell and the backlight unit. Particularly, the luminance-enhancement film is weak in adhesive strength because the luminance-enhancement film is often provided as a laminate of a plurality of layers. Accordingly, the problem occurs easily in the luminance-enhancement film.

SUMMARY OF THE INVENTION

An object of the invention is to provide a laminated optical film which can solve the problem in the related art, which is used for a liquid-crystal display device and which has excellent reworkability after sticking of the laminated optical film onto a liquid-crystal cell, as well as excellent machining characteristic and excellent dimensional accuracy, and to provide a method for producing the laminated optical film and a liquid-crystal display device using the laminated optical film.

To achieve the foregoing object, in accordance with the invention, there is provided a method of producing a laminated optical film constituted by a laminate of a plurality of optical films different in area, the method including the steps of:

laminating an optical film (B) having a plurality of rectangular holes parallel to one another, on at least one surface of an optical film (A) to thereby form a laminate; and cutting the laminate into a plurality of chips.

Preferably, in the producing method according to the invention, the optical film (A) is a polarizer whereas the optical film (B) is a luminance-enhancement film.

Preferably, in the producing method according to the invention, the optical film (A) is an optical film including at least one retardation film or viewing angle compensating film laminated on a surface opposite to a surface through which the optical film (A) is stuck onto the optical film (B).

Preferably, in the producing method according to the invention, the optical film (B) is an optical film constituted by a combination of cholesteric liquid crystal and a λ/4 plate.

Preferably, in the producing method according to the invention, the optical film (A) and the optical film (B) are laminated on each other through a pressure sensitive adhesive.

According to the invention, there is provided a laminated optical film produced by the method, the laminated optical film having extruded portions formed from the optical film (A), the laminated optical film having at least one side surface cut in a plane.

According to the invention, there is provided a liquid-crystal display device including a liquid-crystal cell, and at least one laminated optical film defined above and disposed on at least one surface of the liquid-crystal cell.

Preferably, in the liquid-crystal display device according to the invention, at least one of the extruded portions of the laminated optical film is stuck onto a surface light source through a double-sided adhesive tape.

Features and advantages of the invention will be evident from the following detailed description of the preferred embodiments described in conjunction with the attached drawings.

DETAILED DESCRIPTION OF THE PREFERRED EMBODIMENTS

An embodiment on a laminated optical film and a method of producing the laminated optical film according to the invention will be described with reference to FIGS. 1 and 2, FIGS. 3A and 3B, FIGS. 4 through 6.

Figure 3A:
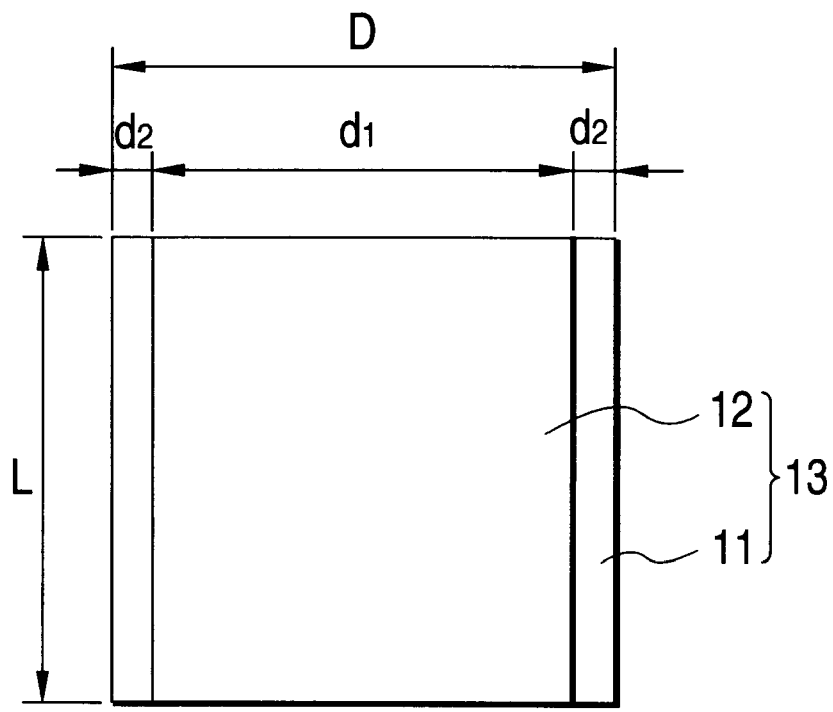
FIGS. 3A and 3B are a front view and a sectional view showing a laminated optical film.
Figure 3B:
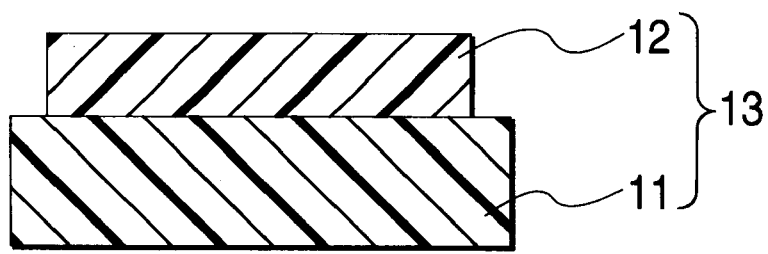

The laminated optical film obtained by the producing method according to the invention has a structure as shown in FIGS. 3A and 3B. That is, the laminated optical film has, as its basic structure, a structure in which: the area of an optical film (A) (11: first optical film) is larger than the area of an optical film (B) (12: second optical film); the optical film (A) 11 has extruded portions at opposite ends in the widthwise direction; and the laminated optical film has at least one side surface cut in a plane. The length L of the laminated optical film varies in accordance with the applications and without any particular limitation. The length L is generally in a range of from 10 mm to 150 mm. The width D of the laminated optical film also varies in accordance with the applications without any particular limitation. The width D is generally in a range of from 10 mm to 150 mm, preferably in a range of from 20 mm to 70 mm. The width $d_1$ of the optical film (B) laminated on the optical film (A) is generally in a range of from 8 mm to 150 mm. The optical film (A) has portions $d_2$ extruded by a width of from 1 mm to 4 mm from opposite ends of the optical film (B) in the widthwise direction. If the width of each of the extruded portions $d_2$ in the optical film (A) is smaller than 1 mm, a double-sided adhesive tape cannot be stuck onto the extruded portion so that a surface light source cannot be bonded to the extruded portion. If the width of each of the extruded portions $d_2$ is larger than 4 mm, the extruded portion overlaps with the display screen range so that display quality is lowered. Incidentally, the laminated optical film may be provided as a laminate further containing any other suitable optical layer(s) than the optical films (A) and (B).

Figure 4:
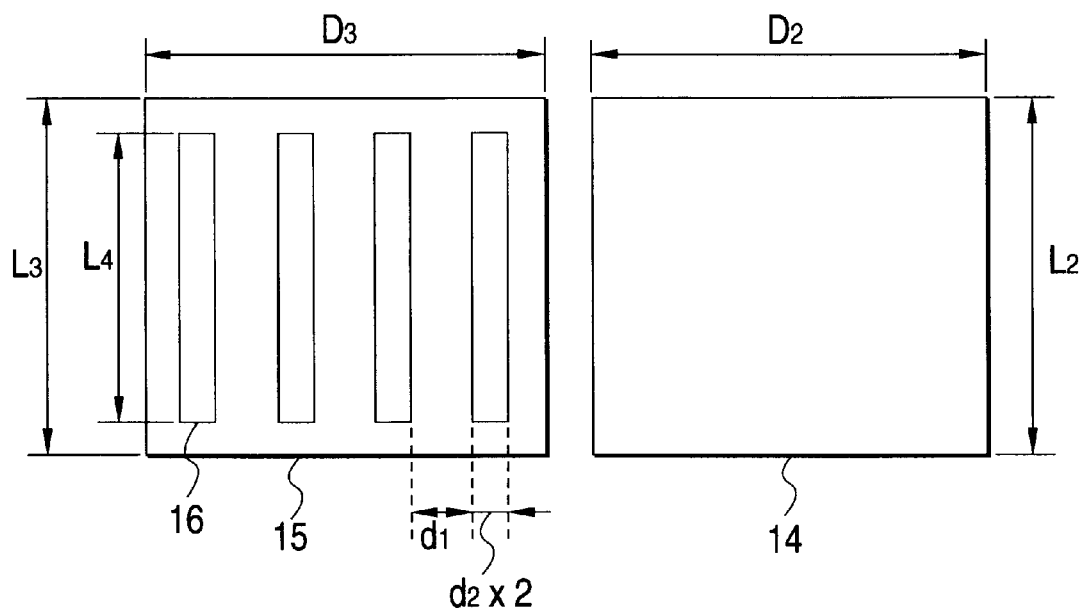
FIG. 4 is a view showing the outline of optical films (A) and (B) before lamination.
Figure 5:
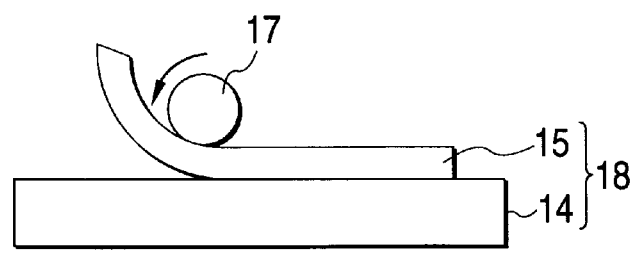
FIG. 5 is a view showing the outline of sticking based on rolling.

On the other hand, the laminated optical film produced according to the invention is obtained as a cut laminated optical film. That is, as shown in FIG. 4, an optical film (B) 15 having a plurality of rectangular holes parallel to one another is laminated on an optical film (A) 14 with a predetermined size to thereby form an optical film laminate 18 (FIG. 5). The optical film laminate 18 is cut into a plurality of chips by a suitable cutter. The cut laminated optical film which is one of the plurality of chips can be used as a liquid-crystal display element having the cut size. Further, the cut laminated optical film has extruded portions at opposite ends in the widthwise direction. The extruded portions are constituted by only the optical film (A) where the optical film (B) is not laminated. Hence, an adhesive unit such as a double-sided adhesive tape can be provided in one of the extruded portions. When a surface light source (backlight) is stuck onto the extruded portion by the adhesive unit, there is an advantage in that the surface light source can be stuck closely to the laminated optical film.

The kind and material of the double-sided adhesive tape used here is not particularly limited. A double-sided adhesive tape known in the related art may be used suitably.

In the invention, any film can be suitably used as each of the optical films (A) and (B) constituting the optical film laminate without any particular limitation if the film can be used for a liquid-crystal display device. From the point of view of good adhesion of the double-sided adhesive tape and improvement of reworkability, it is preferable that a polarizer and a luminance-enhancement film are used as the optical films (A) and (B) respectively. It is also preferable that a laminate of a polarizer and at least one retardation film or viewing angle compensating film through a pressure sensitive adhesive is used as the optical film (A) in accordance with a liquid-crystal cell used.

Figure 1:
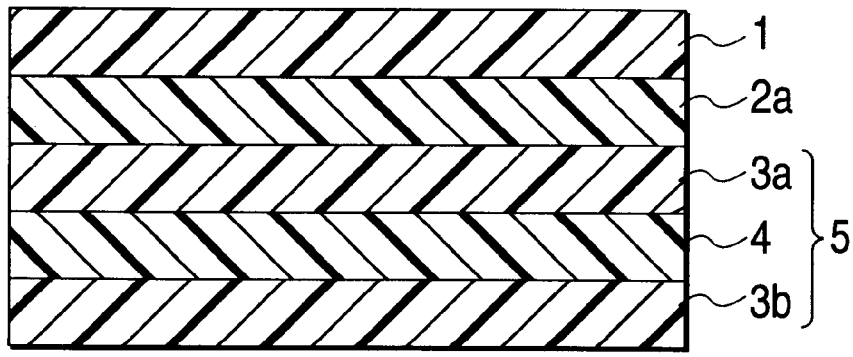
FIG. 1 is a sectional view showing the configuration of a polarizer used as an optical film (A) in the invention.

In the producing method according to the invention, when a polarizer is used as the optical film (A), as an example shown in FIG. 1, the optical film (A) has a structure in which protective films $3a$ and $3b$ such as triacetyl cellulose (TAC) films are stuck onto opposite surfaces of a polarizing element 4 made of a synthetic resin film such as a polyvinyl alcohol film containing iodine or dichromatic dye adsorbed thereto and oriented. In the polarizer shaped like a strip of paper, an adhesive layer $2a$ is provided on an outer surface of one $3a$ of the TAC films so that the optical film (A) can be bonded to a liquid-crystal cell by the adhesive layer $2a$. A release film 1 is further stuck onto the adhesive layer $2a$.

The thickness of the adhesive layer is generally in a range of from about 10 $\mu$m to about 35 $\mu$m, and the thickness of the release film is generally in a range of from about 15 $\mu$m to about 100 $\mu$m.

That is, the basic structure of the polarizer used in the invention is as follows. A transparent protective film which serves as a protective layer is bonded to one or each of opposite surfaces of a polarizing element through a suitable adhesive layer. For example, the polarizing element is made of a dichromatic substance-containing polyvinyl alcohol-based polarization film formed by dyeing, crosslinking, drawing and drying of a synthetic resin film. For example, the adhesive layer is made of a vinyl alcohol-based polymer.

As the polarizing element (polarization film), it is possible to use a suitable polarizing element which is a film of a suitable vinyl alcohol-based polymer, such as polyvinyl alcohol or partial formalized polyvinyl alcohol, subjected to suitable processes such as a dyeing process using a dichromatic substance such as iodine or dichromatic dye, a drawing process and a crosslinking process in a suitable sequence and manner and which can transmit linearly polarized light when natural light is incident on the polarizing element. Particularly, a polarizing element excellent in light transmittance and the degree of polarization is preferably used. The thickness of the polarizing element is not particularly limited. The thickness of the polarizing element is generally preferably in a range of from 1 μm to 80 μm, especially in a range of from 2 μm to 40 μm.

As the material of the protective film which serves as a transparent protective layer and which is provided on one or each of opposite surfaces of the polarizing element (polarization film), it is possible to use a suitable transparent film. Especially, a film of a polymer excellent in transparency, mechanical strength, thermal stability and moisture sealability is preferably used as the protective film. Examples of the polymer include: acetate-based resin such as triacetyl cellulose; polyester-based resin; polyethersulfone-based resin; polycarbonate-based resin; polynorbornene-based resin; polyamide-based resin; polyimide-based resin; polyolefin-based resin; and acrylic-based resin. However, the polymer is not limited thereto. The thickness of the transparent protective film is optional but generally set to be not larger than 500 μm, preferably in a range of from 5 μm to 300 μm in order to reduce the thickness of the polarizer. Incidentally, when transparent protective films are provided on opposite surfaces of the polarization film, the transparent protective films used may be made of different polymers respectively so that the transparent protective films are different in material between front and rear surfaces.

The transparent protective film used as a protective layer may be a film subjected to a hard coat treatment, an anti-reflection treatment or a treatment for anti-sticking, diffusion or anti-glare if the object of the invention is not spoiled. The hard coat treatment is a technique for preventing a surface of the polarizer from being injured. For example, a hard coating film excellent in hardness, sliding characteristic, etc. and made of a suitable ultraviolet-curable resin such as a silicone-cased resin can be formed on a surface of the transparent protective film, for example, by an attaching method.

On the other hand, the anti-reflection treatment is a technique for preventing external light from being reflected by a surface of the polarizer. The anti-reflection treatment can be achieved by the formation of an anti-reflection film in accordance with the related art. The anti-sticking is provided for preventing the transparent protective film from being stuck closely to an adjacent layer. The anti-glare treatment is a technique for preventing viewing of light transmitted through the polarizer from being disturbed by external light reflected by a surface of the polarizer. For example, the anti-glare treatment can be achieved by a fine irregularity structure which is given to a surface of the transparent protective film by a suitable method such as a surface-roughening method using sandblasting or embossing or a transparent fine particle mixing method.

For example, transparent fine particles with a mean particle size of from 0.5 to 20 μm can be used as the transparent fine particles. Examples of the material of the transparent fine particles include silica, alumina, titania, zirconia, tin oxide, indium oxide, cadmium oxide, and antimony oxide. Inorganic fine particles having electrically conductive characteristic may be used or organic fine particles made of a crosslinked or non-crosslinked polymer granular substance may be used as the transparent fine particles. The amount of the transparent fine particles used is generally in a range of from 2 to 70 parts by mass, particularly in a range of from 5 to 50 parts by mass with respect to 100 parts by mass of a transparent resin.

The transparent fine particle-containing anti-glare layer may be provided as the transparent protective layer itself or as a layer applied on a surface of the transparent protective layer. The anti-glare layer may serve also as a diffusing layer (a viewing angle compensating function, etc.) to diffuse light transmitted through the polarizer to thereby enlarge the viewing angle. Incidentally, the anti-reflection layer, the anti-sticking layer, the diffusing layer, the anti-glare layer, etc. may be provided as optical layers made of sheets containing these layers provided therein, separately from the transparent protective layer.

The process of bonding the polarizing element (polarization film) to the transparent protective film which is a protective layer is not particularly limited. For example, the bonding process can be carried out through a pressure sensitive adhesive of a vinyl alcohol-based polymer or through a pressure sensitive adhesive at least containing an aqueous crosslinker of a vinyl alcohol-based polymer such as boric acid, borax, glutaraldehyde, melamine or oxalic acid. The adhesive layer maybe formed as a dried layer of an applied aqueous solution. Another additive or a catalyst such as acid may be mixed with the aqueous solution if necessary.

Figure 2:
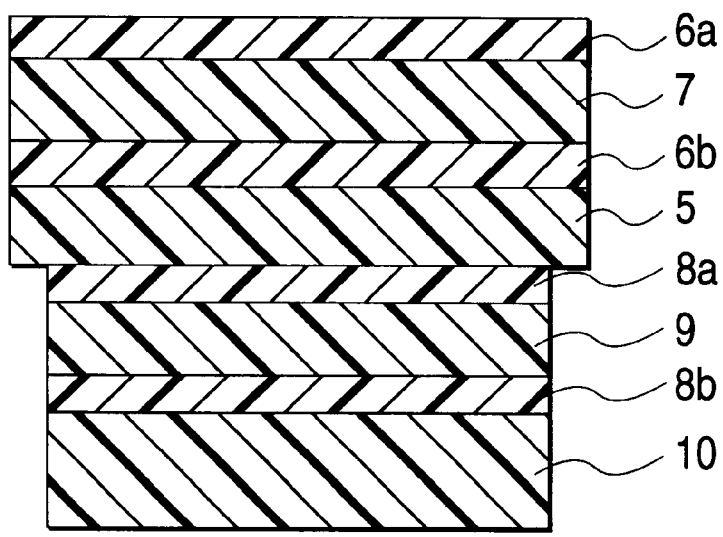
FIG. 2 is a sectional view showing the configuration of a retardation film-containing polarizer used as an optical film (A) in the invention.

In the producing method according to the invention, when a laminated film constituted by a polarizer and a retardation film or viewing angle compensating film is used as the optical film (A), as an example shown in FIG. 2, the optical film (A) has a structure in which a retardation film or viewing angle compensating film 7 made of a drawn resin film of polycarbonate is stuck to a polarizer 5 through a pressure sensitive adhesive 6b. In the laminated film, an adhesive layer 6a is provided on an outer surface of the phase different film or viewing angle compensating film 7 so that the optical film (A) can be bonded to a liquid-crystal cell by the adhesive layer 6a. A release film may be stuck onto the adhesive layer 6a if necessary.

As an example shown in FIG. 2, in the laminate of the optical films (A) and (B), the optical film (B) has a structure in which a cholesteric liquid-crystal layer 10 and a λ/4 plate 9 are stuck to each other through an adhesive layer 8b, and the optical film (B) is stuck to the polarizer 5 through an adhesive layer 8a provided on an outer surface of the λ/4 plate 9.

The thickness of the retardation film is generally in a range of from about 5 μm to about 150 μm, and the thickness of the viewing angle compensating film is generally in a range of from about 5 μm to about 250 μm.

The thickness of the luminance-enhancement film constituted by the combination of the cholesteric liquid-crystal layer and the λ/4 plate is generally in a range of from about 30 μm to about 300 μm.

The thickness of the adhesive layer is generally in a range of from about 10 μm to about 35 μm, and the thickness of the release film is generally in a range of from about 15 μm to about 100 μm.

Specific examples of the phase retarder (retardation film) used in the invention include: a birefringent film obtained by drawing a film of a suitable polymer such as polycarbonate, polyvinyl alcohol, polystyrene, polymethyl methacrylate, polypropylene and other polvolefins, polyallylate, polyamide, etc.; an oriented film of a liquid-crystal polymer; and an oriented layer of a liquid-crystal polymer supported by a film.

Examples of the viewing angle compensating film used in the invention include: a film obtained by applying discotic liquid crystal onto a triacetyl cellulose film or the like; and a phase retarder. Although a polymer film uniaxially drawn in a planar direction thereof and having birefringence is used as a normal phase retarder, a biaxially drawn film such as a polymer film biaxially drawn in a planar direction thereof and having birefringence is used as the phase retarder used as the viewing angle compensating film. As a raw material polymer for forming the phase retarder, any one of polymers listed above as the material of the phase retarder may be used.

The viewing angle compensating film is a film for enlarging the viewing angle so that an image can be viewed relatively sharply even in the case where a screen of a liquid-crystal display device is viewed not perpendicularly but obliquely to the screen.

A suitable film can be used as the luminance-enhancement film used in the invention. Examples of the luminance-enhancement film include: a film exhibiting characteristic capable of transmitting linearly polarized light with a predetermined axis of polarization while reflecting the other light, such as a multi-layer thin film of dielectrics or a multi-layer laminate of thin films different in refractive index anisotropy; and a film exhibiting characteristic capable of reflecting one of left-handed and right-handed components of circularly polarized light while transmitting the other component, such as a chorlesteric liquid-crystal layer, especially an oriented film of a cholesteric liquid-crystal polymer or a film containing an oriented liquid-crystal layer of a cholesteric liquid-crystal polymer supported on a film base material.

A film constituted by a combination of a cholesteric liquid-crystal layer and a λ/4 plate is preferably used as the luminance-enhancement film.

Accordingly, in the luminance-enhancement film of the type capable of transmitting linearly polarized light with a predetermined axis of polarization, when light transmitted through the luminance-enhancement film is made incident on the polarizer directly while the axis of polarization is made uniform, the light can be transmitted through the polarizer efficiently while absorption loss due to the polarizer is suppressed. On the other hand, in the luminance-enhancement film of the type capable of transmitting circularly polarized light such as a cholesteric liquid-crystal layer, the circularly polarized light transmitted through the luminance-enhancement film can be made incident on the polarizing element directly but it is preferable from the point of view of suppression of absorption loss that the circularly polarized light transmitted through the luminance-enhancement film is made to be linearly polarized by a phase retarder so that the linearly polarized light is made incident on the polarizer. Incidentally, when a quarter-wave plate is used as the phase retarder, circularly polarized light can be converted into linearly polarized light.

For example, the phase retarder which functions as a quarter-wave plate in a wide wavelength range such as a visible region can be obtained by a method of superposing a phase difference layer functioning as a quarter-wave plate for monochromatic light such as light with a wavelength of 550 nm, on a phase difference layer exhibiting the other phase difference characteristic such as a phase difference layer functioning as a half-wave plate. Hence, the phase retarder disposed between the polarizer and the luminance-enhancement film may be constituted by one phase difference layer or by a plurality of phase difference layers.

Incidentally, when the cholesteric liquid-crystal layer is formed as a superposed arrangement structure constituted by a combination of at least two layers different in reflection wavelength, a layer capable of reflecting circularly polarized light in a wide wavelength range such as a visible region can be obtained. Circularly polarized light transmitted in a wide wavelength range can be obtained on the basis of the cholesteric liquid-crystal layer.

As shown in FIG. 4, the optical film (A) is supplied as an optical film roll (raw roll) processed into a predetermined size. When a laminated film constituted by a polarizer and a retardation film or viewing angle compensating film is used as the optical film (A), the optical film (A) is supplied as a film with a predetermined size after the polarizer and the retardation film or viewing angle compensating film are stuck to each other. The size of the film is determined suitably in accordance with the applications of the optical film without any particular limitation. Generally, the width $D_2$ of the film is in a range of from 150 mm to 400 mm, and the length $L_2$ of the film is in a range of from 150 mm to 450 mm.

As shown in FIG. 4, the optical film (B) is a film supplied in accordance with the size of the optical film (A) and cut by a suitable cutter such as a guillotine type punching tool so that a plurality of rectangular holes 16 parallel to one another are formed. The size of the film is determined suitably in accordance with the applications of the optical film without any particular limitation. Generally, the width $D_3$ of the film is in a range of from 150 mm to 400 mm, and the length $L_3$ of the film is in a range of from 150 mm to 450 mm. The width of each of the rectangular holes is twice ($d_2 \times 2$) as large as the width $d_2$ of each of the extruded portions. The length $L_4$ of each of the rectangular holes is generally in a range of from 140 mm to 430 mm. The distance between adjacent ones of the rectangular holes in the lengthwise direction is equal to the width $d_1$ of the laminated optical film. The holes may be provided in a direction oblique to any side of the optical film (B) if the holes are parallel to one another. According to this shape, when the laminate of the optical films (B) and (A) is cut, extruded portions can be provided in the optical film (A) so that a surface light source (backlight) can be stuck to the optical film (A) through one of the extruded portions. Accordingly, in this case, peeling of a layer weak in adhesive strength in a module reworking step can be prevented compared with the case where a luminance-enhancement film which is a multi-layer laminate is stuck to a surface light source (backlight).

A method of producing a laminated optical film according to this embodiment of the invention will be described below with reference to FIGS. 4 through 6.

In a step of processing (cutting) an optical film (into a predetermined size), for example, a film is fed out with a predetermined feed length (pitch) from a raw roll of an optical film. The film is cut by a cutting tool such a cutter, so that optical films (A) and (B) with a predetermined size are extracted as shown in FIG. 4. Then, rectangular holes with a predetermined size are provided in the optical film (B).

Then, as shown in FIG. 5, the optical film (A) 14 (for example, a polarizer or a laminated film constituted by a polarizer and a retardation film or viewing angle compensating film) is stuck to the optical film (B) 15 (for example, a luminance-enhancement film). In this step, a sticking roll is used for placing the optical film (B) on the optical film (A) through an adhesive layer to thereby form a laminate 18 of the optical films (A) and (B). On this occasion, it is preferable that the optical films are stuck to each other in a direction of flow of the holes (in the lengthwise direction of the holes) at a constant speed from an end portion of each film while one of the films is fed along the roll in order to improve dimensional accuracy. Incidentally, even in the case where the holes are provided obliquely, the films can be stuck to each other without any trouble if the films are stuck to each other from the direction of the shallow angle.

When the optical films are stuck to each other, the sticking condition such as sticking speed, sticking temperature, sticking roll, etc. is determined suitably without any particular limitation. Generally, it is preferable that a roll wider than the optical films to be stuck to each other is used for achieving sticking up to an end portion of each film without generation of air bubbles.

Figure 6:
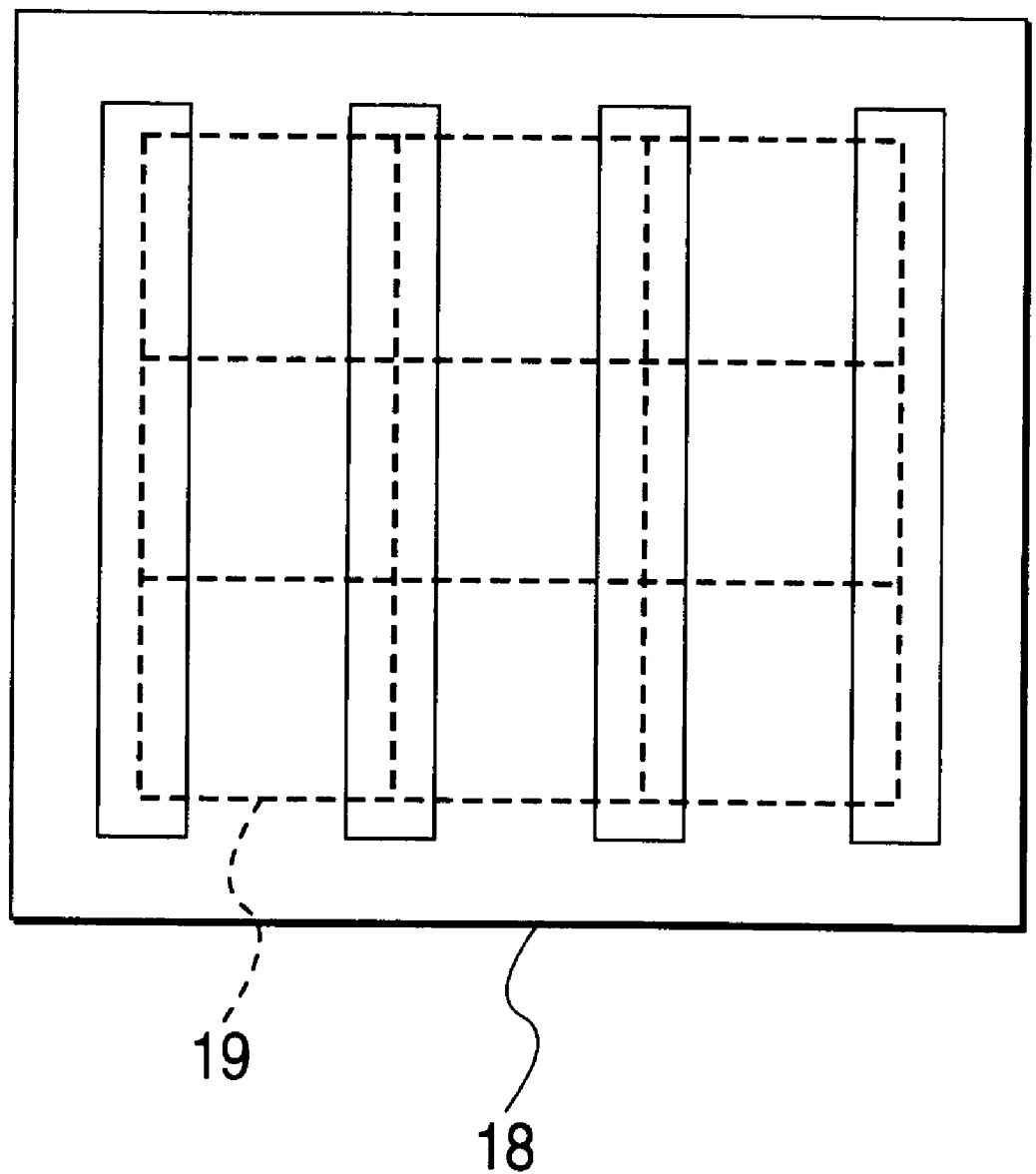
FIG. 6 is a conceptual view showing the configuration of a laminate of optical films (A) and (B) in the case where the laminate is cut into a product size.

Then, as shown in FIG. 6, the optical film laminate 18 is cut into a predetermined size by a suitable cutter such as a guillotine type punching tool 19 (the broken line represents cutting positions) in accordance with the product size so that the lengthwise direction of each of the holes is halved. Thus, rectangular laminated optical films cut into a predetermined size are extracted.

In the producing method according to the invention, when the optical film (A) constituted by a polarizer or the like and the optical film (B) constituted by a luminance-enhancement film or the like are to be laminated on each other, the lamination can be achieved by use of a suitable bonding unit such as an adhesive layer. To relax stress at the time of sticking, stress based on the dimensional change of each film, etc. it is preferable that the lamination is performed through a pressure sensitive adhesive. Similarly, when the polarizer and the retardation film or viewing angle compensating film are to be laminated on each other, the lamination can be achieved by use of a suitable bonding unit such as an adhesive layer. To relax stress at the time of sticking, stress based on the dimensional change of each film, etc. it is preferable that the lamination is performed through a pressure sensitive adhesive.

The adhesive layer can be formed from a suitable pressure sensitive adhesive such as an acrylic-based pressure sensitive adhesive in accordance with the related art. Particularly from the point of view of prevention of a foaming or peeling phenomenon due to moisture absorption, prevention of lowering of optical characteristic or a warp of a liquid-crystal cell due to thermal expansion difference, and formability of a liquid-crystal display device high in quality and excellent in durability, it is preferable that the adhesive layer is low in moisture absorption rate and excellent in heat resistance. The adhesive layer may contain fine particles so that the adhesive layer can be provided as an adhesive layer exhibiting light-diffusing characteristic. The adhesive layer can be provided on a required surface if necessary. For example, with respect to a protective layer in a polarizer constituted by a combination of a polarizing element and the protective layer, the adhesive layer may be provided on one or each of opposite surfaces of the protective layer if necessary.

When the adhesive layer provided on a polarizer or on an optical member is exposed to the surface, it is preferable that the adhesive layer is temporarily covered with a separator for the purpose of anti-contamination until the adhesive layer is put into practical use. The separator can be formed by a method of applying a release coat of a suitable release agent such as a silicone-based agent, a long-chain alkyl-based agent, a fluorine-based agent or molybdenum sulfide onto a suitable thin sheet made of any one of materials listed above in the description of the transparent protective film.

Incidentally, each of layers such as the polarization film, the transparent protective film, the optical layer and the adhesive layer constituting the polarizer or the optical member may be formed to have an ultraviolet-absorbing power by a suitable method such as a method of treating the layer with an ultraviolet absorber such as a salicylic ester compound, a benzophenone compound, a benzotriazole compound, a cyanoacrylate compound, or a nickel complex salt compound.

The laminated optical film according to the invention can be preferably used for forming various kinds of devices such as a liquid-crystal display device and can be preferably applied to a transmissive type or a semi-transmissive type liquid-crystal display device in which the laminated optical film according to the invention is disposed on at least one surface of a liquid-crystal cell. The liquid-crystal cell for forming the liquid-crystal display device is optional. For example, a suitable type liquid-crystal cell such as an active matrix drive type liquid-crystal cell represented by a thin-film transistor type liquid-crystal cell or a passive matrix drive type liquid-crystal cell represented by a twisted nematic liquid-crystal cell or a supertwisted nematic liquid-crystal cell may be used.

When polarizers or optical members are provided on opposite surfaces of the liquid-crystal cell, the polarizers or optical members may be equal to each other or may be different from each other. When a liquid-crystal display device is formed, suitable parts such as a prism array sheet, a lens array sheet, a light-diffusing plate, a backlight, etc. may be disposed in suitable positions so that the parts can be provided as one layer or as a plurality of layers.

The invention will be described below more specifically in connection with the following examples.

EXAMPLE 1

A retardation film made of polycarbonate and exhibiting a phase difference value of 140 nm was produced. 25 $\mu$m-thick layers of an acrylic-based pressure sensitive adhesive were formed on opposite surfaces of the retardation film. A dichromatic polarizer was stuck to the phase retarder through the pressure sensitive adhesive so that the absorption axis of the dichromatic polarizer and the retarded phase axis of the phase retarder made an angle of 45 degrees. Thus, a retardation film-containing polarizer was produced.

A 0.1 $\mu$m-thick PVA oriented film was formed on an 80 $\mu$m-thick TAC film. After the oriented film was rubbed, three layers of cholesteric liquid-crystal polymer with selective reflection center wavelengths of 400 nm, 550 nm and 700 nm were formed and oriented successively on the oriented film. The thickness of each of the layers was 3 $\mu$m. Then, a $\lambda$/4 plate of polycarbonate (frontal phase difference: 140 nm) was stuck onto the cholesteric liquid-crystal layers by a 25 $\mu$m-thick acrylic-based pressure sensitive adhesive. Thus, a luminance-enhancement film was produced.

Then, a film with a size of 170 mm×140 mm was cut, with the absorption axis of the polarizer as a lengthwise direction, out of the retardation film-containing polarizer produced in this manner. Similarly, a film with a size of 170 mm×140 mm was cut out of the luminance-enhancement film and three slits 5 mm wide were formed in the film so that the distance between adjacent ones of the slits was 35 mm. These films were stuck to each other through an acrylic-based pressure sensitive adhesive by use of a sticking roll from the lengthwise direction. Thus, an optical film laminate was produced. Incidentally, the axial angle was set to be 90 degrees with respect to the absorption axis of the polarizer, and the films were stuck to each other so that the optical axis of the luminance-enhancement film was adjusted to the axial angle. The laminate obtained thus was cut into a product size (film (A): 50 mm long by 40 mm wide, film (B): 50 mm long by 35 mm wide, extruded portions: each 2.5 mm wide) by a guillotine type punching tool in the condition that the luminance-enhancement film faced upward. Thus, nine laminated optical films (Nos. 1 to 9) were obtained.

The size of each of the nine laminated optical films obtained thus was measured with a pair of digital calipers, so that a width average and a length average were obtained. Results of the measurement were shown in Table 1. Further, failure on external appearance was confirmed and evaluated by eye observation. There was no abnormality observed.

TABLE 1

|  | Width of Laminated Film (mm) | Length of Laminated Film (mm) | Widths of Extruded Portions | |
|---|---|---|---|---|
|  |  |  | Left (mm) | Right (mm) |
| No. 1 | 40.00 | 49.92 | 2.39 | 2.53 |
| No. 2 | 40.03 | 49.82 | 2.45 | 2.47 |
| No. 3 | 40.15 | 49.88 | 2.42 | 2.55 |
| No. 4 | 40.12 | 49.94 | 2.51 | 2.51 |
| No. 5 | 40.06 | 49.86 | 2.36 | 2.57 |
| No. 6 | 40.05 | 50.00 | 2.33 | 2.45 |
| No. 7 | 39.99 | 49.97 | 2.54 | 2.59 |
| No. 8 | 40.00 | 49.91 | 2.47 | 2.49 |
| No. 9 | 40.03 | 49.85 | 2.57 | 2.61 |
| Average | 40.05 | 49.91 | 2.45 | 2.53 |

It is obvious from Table 1 that the laminated optical film produced by the method according to the invention is excellent in dimensional accuracy.

EXAMPLE 2

Figure 7:
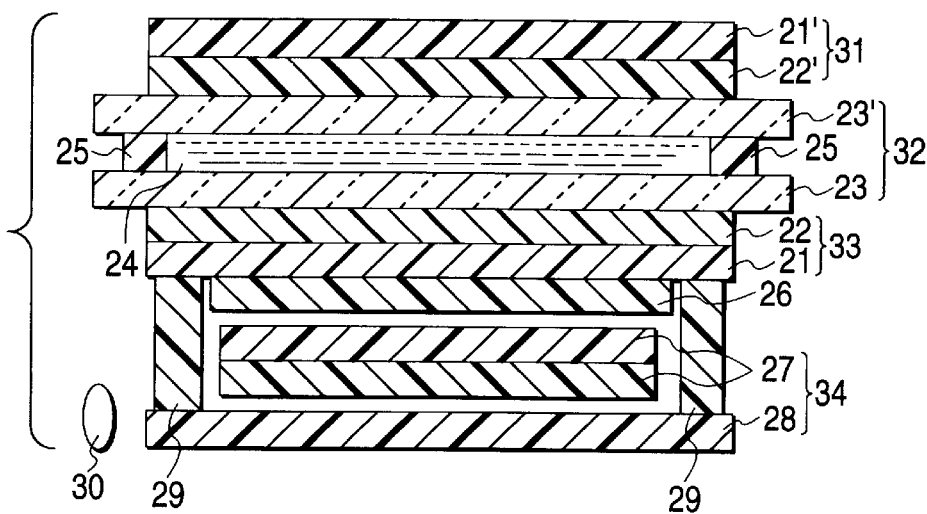
FIG. 7 is a sectional view showing the configuration of a liquid-crystal display device according to the invention.

The laminated optical film produced in Example 1 and having extruded portions was incorporated in a liquid-crystal module, and a backlight unit reworkability test and an impact test were carried out. The incorporation of the laminated optical film in the liquid-crystal module was made as follows. As the configuration shown in FIG. 7, the phase retarder 22 surface of the laminated optical film 33 was stuck to the rear surface of the liquid-crystal cell 32. A double-sided adhesive tape 29 (No. 531MC made by Nitto Denko Corp.) was stuck to one of the extruded portions of the laminated optical film 33. The extruded portion of the laminated optical film 33 was bonded to a light guide plate 28 of a backlight unit 34 through the double-sided adhesive tape 29 (Example according to the invention).

Although this example has shown the case where No. 531MC made by Nitto Denko Corp. is used as the double-sided adhesive tape, the same result can be obtained also in the case where No. 7641 made by Teraoka Corp. is used as the double-sided adhesive tape.

Figure 8:
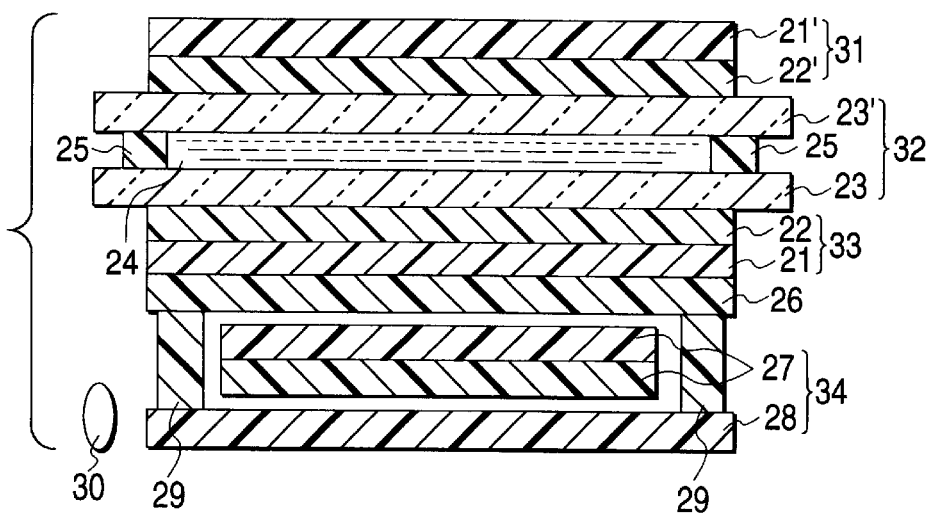
FIG. 8 is a sectional view showing the configuration of a related-art liquid-crystal display device.

For the sake of comparison, a laminated optical film was produced in the same manner as in Examples 1 and 2 except that extruded portions were not provided in the laminated optical film. As the configuration shown in FIG. 8, the phase retarder 22 surface was stuck to the rear surface of the liquid-crystal cell 32. The luminance-enhancement film 26 surface and the light guide plate 28 were bonded to each other through the double-sided adhesive tape 29 (No. 531MC made by Nitto Denko Corp.)

Comparative Example

[Evaluating Method]
(Backlight Unit Reworkability Test)
In the liquid-crystal module in which the liquid-crystal cell and the backlight unit were bonded to each other by the double-sided adhesive tape, the abnormality of the laminated optical film in the case where the backlight unit was peeled from the liquid-crystal cell was tested.
(Impact Test)
The liquid-crystal module in which the laminated optical film was stuck to the rear surface of the liquid-crystal cell and in which the backlight unit was bonded to the liquid-crystal cell through the double-sided adhesive tape was incorporated in a cellular phone. The cellular phone was dropped down from a height of 150 cm so that each of surfaces (six surfaces in total, that is, front, rear, side, upper and lower surfaces) of the cellular phone collided with a plane of a marble pedestal. On this condition, the abnormality of the laminated optical film was tested. That is, on this occasion, the impact test was carried out six times so that impact was applied on each of the surfaces (six surfaces in total, that is, front, rear, side, upper and lower surfaces) of the cellular phone.

Results of the backlight unit reworkability test and the impact test applied to Example according to the invention and Comparative Example were shown in Table 2.

TABLE 2

|  | Example according to the invention (With extruded portions) | Comparative Example (Without extruded portions) |
|---|---|---|
| Backlight Unit Reworkability Test | No abnormality | Cohesive failure |
| Impact Test | No abnormality | Cohesive failure |

It is obvious from Table 2 that the laminated optical film produced by the method according to the invention has no failure in the backlight unit reworkability test and the impact test because the double-sided adhesive tape is not bonded to the luminance-enhancement film so that no force is applied on the luminance-enhancement film during the tests.

As described above, in the method of producing a laminated optical film according to the invention, first, each of the optical films (A) and (B) is cut into a predetermined shape, predetermined holes are provided in the optical film (B), and these films are laminated on each other to thereby form an optical film laminate. Then, the laminate is cut into laminated optical films. Accordingly, the optical film laminate with a predetermined size can be formed at the same time that the optical film laminate can be processed into a product size without the related-art step, that is, without the step of sticking optical films cut into a predetermined size. Hence, the method according to the invention is excellent in production efficiency. Moreover, because products are extracted in the final step, the products can be extracted without waste and the dimensional accuracy of the optical film laminate is excellent.

Further, in the producing method according to the invention, the cut optical film laminate has extruded portions. Accordingly, when a pressure sensitive adhesive layer (for example, a double-sided adhesive tape) is provided on one of the extruded portions, the extruded portion can be bonded to a liquid-crystal cell accurately. Hence, light leakage from a liquid-crystal display device can be suppressed while peeling in the module reworking step can be prevented. Moreover, when the optical film laminate according to the invention is used in a liquid-crystal display device, the invention can contribute to reduction in thickness and weight of the liquid-crystal display device. Hence, the industrial value of the invention is large.

Although the invention has been described in its preferred form with a certain degree of particularity, it is understood that the present disclosure of the preferred form can be changed in the details of construction and in the combination and arrangement of parts without departing from the spirit and the scope of the invention as hereinafter claimed.

What is claimed is:

1. A method of producing a laminated optical film constituted by a laminate of a plurality of optical films different in area, said method comprising steps of:

laminating a second optical film having a plurality of rectangular holes parallel to one another, on at least one surface of a first optical film to thereby form a laminate; and cutting said laminate into a plurality of chips.

2. A method of producing a laminated optical film according to claim 1, wherein said first optical film is a polarizer whereas said second optical film is a luminance-enhancement film.

3. A method of producing a laminated optical film according to claim 1, wherein said first optical film is an optical film including at least one retardation film or viewing angle compensating film laminated on a surface opposite to a surface through which said first optical film is stuck onto said second optical film.

4. A method of producing a laminated optical film according to claim 1, wherein said second optical film is an optical film constituted by a combination of cholesteric liquid crystal and $\lambda/4$ plate.

5. A method of producing a laminated optical film according to claim 1, wherein said first optical film and said second optical film are laminated on each other through a pressure sensitive adhesive.

6. A laminated optical film produced by a method according to claim 1, said laminated optical film having extruded portions formed from said first optical film, said laminated optical film having at least one side surface cut in a plane.

7. A liquid-crystal display device comprising a liquid-crystal cell, and at least one laminated optical film according to claim 6 and disposed on at least one surface of said liquid-crystal cell.

8. A liquid-crystal display device according to claim 7, wherein at least one of said extruded portions of said laminated optical film is stuck onto a surface light source through a double-sided adhesive tape.

* * * * *